United States Patent Office 3,313,737
Patented Apr. 11, 1967

3,313,737
METHOD OF PREPARING SILICIC ACID SOLS
Kenneth H. Brinsmead, Huntington, and William B. Brown, Jr., Hempstead, N.Y., assignors to Avnet Shaw, Div. of British Industries Corp., Plainview, N.Y., a corporation of New York
No Drawing. Filed Aug. 12, 1963, Ser. No. 301,601
8 Claims. (Cl. 252—309)

This invention relates to silicic acid sols, especially those wherein the silicic acid is dispersed in an alcohol. More particularly, it is directed to improvements in such sols and method of preparing them.

Silicic acid sols of the type mentioned have a variety of uses, as for example, in investment casting by the lost wax art, the manufacture of ceramic molds by the Shaw Process (U.S. Patent 2,795,022), the manufacture of refractory shapes, water-proof coatings, fire-resistant paints, etc.

Generally, silicic acid sols of this type are prepared by hydrolysis of alkyl esters of silicic acid. A frequently used starting material is a condensed ethyl silicate, having a silica content of about 40%, which is hydrolyzed with water in the presence of a mutual solvent, as for example, a lower alkanol, the most frequently used being ethanol or a propanol. The hydrolysis is effectuated by a catalyst, for example, either acidic or alkaline, the most frequently employed catalyst being a strong acid, as for example, hydrochloric or sulfuric, etc.

In the ceramic mold art (see for example, above U.S. Patent 2,795,022), the silica sol is designated as a "binder." The process of making such mold basically comprises forming a slurry from ceramic particles and the binder, including a gel accelerator in the slurry; covering a pattern with the slurry; allowing the slurry to gel; and subsequently separating the pattern from the gelled mass, the mass in this stage being in the "green" state.

It is highly desirable that such binders provide for the following:

(1) A gelled structure having high green strength to permit handling of the mold or ceramic articles after removal from the pattern;

(2) Prolonged stability of the binder during storage so that the binder can be prepared in substantial batches, in advance of actual use, without undergoing auto-gellation.

Heretofore, increase in green strength has been achieved by increasing the silica content of the binder. However, this desideratum has been achieved not only at greater cost, but also at the expense of the stability of the binder. Such instability is unsatisfactory because it requires preparation of small batches of the binder at very frequent intervals.

In pondering over the problem of devising a method or means of producing silica sols of the instant type having improved characteristics, i.e., sols which would enable us to obtain not only gelled ceramic masses of increased green strength but also sols having increased stability, we postulated that such improvements might be achieved by:

(a) Effectuating a better dispersion of the silicic acid in the sol;

(b) Reducing the size of the dispersoid to sizes less than have heretofore been achieved;

(c) Effecting such better dispersion of smaller dispersoids by increasing the rate of hydrolysis, as for example, by effectuating the hydrolysis at elevated temperature.

We found that such sought-for improvements could be achieved, but do not know if that improvement results from (a) and (b) just mentioned. We found, however, that when the hydrolysis is carried out at elevated temperature, i.e., by initiating and carrying out the hydrolysis through the introduction of the catalyst into a mixture of the three components, alkyl silicate, alcohol and water when the mixture is at an elevated temperature, the desired improvements were attained. We also found that the efficacy of the binder was further improved by holding the sol, i.e., the hydrolyzed alkyl silicate, at an elevated temperature for an extended period of time.

Accordingly, it is among the objects of this invention to provide:

(1) A silicic acid sol of improved characteristics as compared with sols heretofore known;

(2) A silicic acid sol having improved stability;

(3) A silicic acid sol for use as a binder in the formation of ceramic molds, ceramic articles, etc. having markedly improved green strength;

(4) A silicic acid sol for use as a binder in the formation of ceramic molds, ceramic articles, etc. characterized by a low silica content;

(5) A silicic acid sol for use as a binder in the formation of ceramic molds, ceramic articles, etc. characterized by marked stability during storage, permitting large batches to be prepared and stored, thus substantially reducing the time of plant personnel entailed in making up binders.

The foregoing objects as well as other objects and advantages which will become apparent hereinafter are achieved in their basic aspects (as heretofore mentioned) by initiating the catalytic hydrolysis (acidic) of a mixture of an alkyl silicate (preferably of high silica content), for example, about 40–43% silica and water in the presence of any known mutual solvent therefor, as for example, an alkanol having up to 5 carbon atoms when the mixture is at an elevated temperature. A desirable elevated temperature is that prevailing when the mixture is maintained under reflux boiling. In the case of a mixture of the well known ethyl silicate 40 and ethanol, the refluxing temperature at atmospheric pressure is about 80° C.

When working with small volumes, a mixture of the ester and the mutual solvent can be maintained under reflux and the water and the acidic catalyst introduced therein by the addition of an aqueous solution of the acid, the acid content thereof being of a concentration adequate to catalyze the hydrolysis.

Such an aqueous acid has the following characteristics: a pH of 0.01 to 2.5, a pK of 0.0 to 4.75622, and an acid concentration of not more than 1.5 N.

When working with larger volumes of materials, the reaction vessel is charged with a mixture of the ester, water and the mutual solvent; and the acidic catalyst added thereto in concentrated form.

In general, the improved silicic acid sol obtained in accordance with this invention can be prepared from the three component system just mentioned (ester, e.g., ethyl silicate, alkanol and water), wherein those components are present in the following amounts:

| | Parts |
|---|---|
| Ester | 1 |
| Alkanol | 0.7–1.2 |
| Water | 0.07–1.5 |

The three component mixture is heated, preferably under reflux at atmospheric pressure until the temperature thereof reaches about 80° C. The heating may be discontinued and the catalyst introduced therein, as for example, sulfuric acid or hydrochloric acid. Hydrolysis is thus initiated and the exothermic reaction continues for 5 to 45 minutes. On cooling, the reaction mass constitutes a silicic acid sol.

As has been previously mentioned, it has been found that a silicic acid sol for use as a binder has even better characteristics than the sol just mentioned and is obtained if the refluxing is continued after the above mentioned 45 minute interval during which the hydrolysis takes place. It has been found that such additional heating, when carried out for a period of from one to six hours, is particularly beneficial in providing a silica sol for use as a binder.

The improved characteristics of the instant silicic acid sol (silicic acid dispersed in the alkanol, which may contain a small amount of water) as a binder are evidenced when a comparison is made of the green strength of test bars prepared from the instant binder with the green strength of test bars made from the customary binders heretofore used which have the same silica content.

Silicic acid sols in accordance with this invention which are useful in binders in manufacturing ceramic molds, ceramic articles, etc. are those whereof the silica content is: 10 to 30% by weight.

Accordingly, a silicic acid sol of the desired silica content can be prepared by the stoichiometric proportioning of the ethyl silicate and water to provide for complete hydrolysis of the ester along with suitable variation in the volume of the alkanol, the latter variation providing for the ultimate silica content sought for.

When the catalyst is introduced in the form of a dilute aqueous solution, a variety of formulations may be prepared as follows:

20–30 parts of ethyl silicate,
15–30 parts of the alkanol and
1.5 to 4.6 parts of the catalyst solution.

The following are examples in accordance with this invention:

*Example 1*

A three-necked flask, fitted with a thermometer, a reflux condenser and a separatory funnel is charged with a mixture of 25 parts of ethyl silicate 40 and 25 parts of anhydrous isopropanol. The separatory funnel is charged with 2.5 parts of 0.01% sulfuric acid solution.

The contents of the flask are heated to reflux (temperature about 80° C.) and stirred by means of a magnetic stirrer. The aqueous acid is then slowly dripped in at a rate to keep the exothermic reaction within bounds. A drip speed of from 2.2 mls. per minute to 5.5 mls. per minute is satisfactory.

After all the acid is introduced and the exothermic peak reached, the mass is allowed to cool. The finished product constitutes a binder.

*Example 2*

A batch of ethyl silicate and isopropanol, in an amount similar to that of Example 1 is hydrolyzed in accordance with the procedure described in Example 1. After the exothermic peak has been reached, the reaction mass is maintained, with stirring, at a refluxing temperature for an additional period of six hours.

On cooling, the reaction mass constitutes a binder which is used in preparing a ceramic test bar having outstandingly improved green strength when compared with a test bar prepared from ceramic particles and a conventional hydrolysed ethyl silicate binder. The green strengths are determined in accordance with the general method of ASTM Procedure No. C268-51T using, in place of the rectangular test bars of that method, cylindrical bars 8 inches long and ¾ inch in diameter.

It has also been found that the stability of the instant silica sols is markedly superior to that of the silica sols heretofore known. The increased stability was ascertained by the following tests:

(1) Maintaining the sol at a constant temperature bath at 40° C. over an extended period of time, and
(2) Refluxing a sample at 80° until it undergoes autogellation.

When held at a constant temperature of 40° C., the improved sol did not exhibit autogellation for a period of 46 days. When subjected to refluxing at 80° C., the sol did not exhibit autogellation for a period of 20 days.

*Example 3*

A reactor is charged with 300 gallons of ethyl silicate 40; 200 gallons of isopropanol and 22.9 gallons of water, preferably distilled. The mixture is stirred and the temperature thereof brought to 80° C.

While stirring, there were introduced therein 0.42 gallon of concentrated hydrochloric acid, 37%, at a rate to keep the exothermic reaction within bounds. After completion of the reaction, the temperature thereof is maintained, as described in the foregoing examples, for a period of three hours.

The term "ethyl silicate" as used herein, embraces ethylorthosilicate $[SiO(C_2H_5)_4]$ as well as the condensation products thereof having a silica content of up to about 43%.

It will be understood that the foregoing description of the invention and the examples set forth are merely illustrative of the principles thereof. Accordingly, the appended claims are to be construed as defining the invention within the full spirit and scope thereof.

We claim:

1. In a method of preparing a silicic acid sol from an alkyl silicate wherein the alkyl silicate is hydrolyzed by water in the presence of a mutual solvent by the catalytic action of a strong acid, the improvement which comprises initiating and carrying out said hydrolysis at a temperature at which the mixture of the alkyl silicate and the solvent refluxes at atmospheric pressure, thereby to attain an exothermic peak temperature, and continuing to maintain the temperature of the reaction mixture at about said peak temperature for a period of from one to six hours after completion of the hydrolysis.

2. In a method of preparing a silicic acid sol from an alkyl silicate wherein an alkyl silicate is hydrolyzed by water in the presence of a mutual solvent by the catalytic action of a strong acid, the improvement which comprises initiating the hydrolysis at a temperature at which the mixture of alkyl silicate and the solvent refluxes under atmospheric pressure, allowing the hydrolysis to attain an exothermic peak temperature, and continuing to maintain the temperature of the reaction mixture, after the attainment of said peak, at or about said peak temperature for a period of from one to six hours after completion of the hydrolysis.

3. In a method of preparing a silicic acid sol from ethyl silicate having a silica content of 28 to 43% wherein the ethyl silicate is hydrolyzed by water in the presence of an alkanol having up to 5 carbon atoms by the catalytic action of a strong acid, the improvement which comprises initiating and carrying out said hydrolysis at a temperature at which the mixture of the ethyl silicate and the alkanol refluxes under atmospheric pressure, thereby to attain an exothermic peak temperature, and continuing to maintain the temperature of the reaction mixture at about said peak temperature for a period of from one to six hours after completion of the hydrolysis.

4. Method in accordance with claim 3 wherein the alkanol is ethanol.

5. Method in accordance with claim 4 wherein the silicate and water are substantially proportioned to provide for complete hydrolysis of the silicate.

6. Method in accordance with claim 4 wherein the strong acid is hydrochloric or sulfuric acid.

7. Method in accordance with claim 6 wherein the water is brought into the hydrolysis system in the form of a dilute aqueous solution of the acid.

8. In a method of preparing a silicic acid sol from ethyl silicate having a silica content of 28 to 43% wherein the ethyl silicate is hydrolyzed by water in the presence of an alkanol having up to 5 carbon atoms by the catalytic action of a strong acid, the improvement which comprises initiating the hydrolysis at a temperature at which the mixture of the ethyl silicate and the alkanol refluxes at atmospheric pressure, allowing the hydrolysis to attain an exothermic peak temperature and continuing to maintain the temperature of the reaction mixture, after the attainment of said peak, at or about said peak temperature for a period of from one to six hours.

References Cited by the Examiner
UNITED STATES PATENTS

| | | | |
|---|---|---|---|
| 1,809,755 | 6/1931 | King et al. | 252—309 X |
| 2,524,358 | 10/1950 | Robey | 252—309 X |

LEON D. ROSDOL, Primary Examiner.

SAMUEL H. BLECH, ALBERT T. MEYERS, Examiners.

R. D. LOVERING, Assistant Examiner.